(12) United States Patent
Csutak (10) Patent No.: US 7,638,761 B2
(45) Date of Patent: Dec. 29, 2009

(54) HIGH TEMPERATURE DOWNHOLE TOOL

(75) Inventor: Sebastian Csutak, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 51 days.

(21) Appl. No.: 11/837,692

(22) Filed: Aug. 13, 2007

(65) Prior Publication Data

US 2009/0045814 A1 Feb. 19, 2009

(51) Int. Cl.
*G01V 5/04* (2006.01)
(52) U.S. Cl. .................................... 250/269.1
(58) Field of Classification Search ............... 250/253, 250/256, 269.1
See application file for complete search history.

(56) References Cited

U.S. PATENT DOCUMENTS

| | | | |
|---|---|---|---|
| 4,791,636 A | 12/1988 | Yamamoto et al. |
| 5,406,574 A | 4/1995 | Rennie et al. |
| 5,805,624 A | 9/1998 | Yang et al. |
| 6,100,543 A | 8/2000 | Sakata |
| 7,015,498 B2 | 3/2006 | Ebe et al. |
| 7,196,786 B2 | 3/2007 | DiFoggio |
| 7,279,678 B2 | 10/2007 | Andrews et al. |
| 2004/0011950 A1 | 1/2004 | Harkins |
| 2005/0199870 A1 | 9/2005 | Gray et al. |
| 2007/0035737 A1 | 2/2007 | Andrews et al. |
| 2007/0081157 A1 | 4/2007 | Csutak et al. |

OTHER PUBLICATIONS

Banford, Douglas et al., "Widely-Tunable Rapid-Scanning Mid-IR Laser Spectrometer for Industrial Gas Process Stream Analysis," (AA reference conitnued) Laser Applications to Chemical, Security and Environmental Analysis 2006, Feb. 5-9, 2006, Incline Village, Nevada.

Gavryushin, V. "Quantum Structures: Densities of States for Two-Dimensional and One-Dimensional Electron Gases," Apr. 18, 2002, pp. 1-4, Vilnius University, (BB reference continued) www.mtmi.vu.lt/pfk/funkc_dariniai/nanostructures/quant_structures.htm.

Deppe, D. G. et al., "Quantum Dot Laser: Temperature Insensitive Operation and the Prospect for High Speed Modulation," Microelectronics Research Center, (CC reference continued) Department of Electrical and Computer Engineering, The University of Texas at Austin, Austin, Texas; pp. 135-136.

(Continued)

*Primary Examiner*—David P Porta
*Assistant Examiner*—Marcus H Taningco
(74) *Attorney, Agent, or Firm*—Cantor Colburn LLP (57) ABSTRACT

Apparatus and method for estimating a downhole parameter include a high-gain semiconductor device having a plurality of semiconductor layers forming an active region, the active region having a bandgap offset that provides device operation through at least the temperature environment of a downhole location, the high-gain semiconductor device being used at least in part to estimate a downhole parameter.

37 Claims, 7 Drawing Sheets

OTHER PUBLICATIONS

Gonul, B. et al., "Theroretical Comparison of the Band Alignment of Conventionally Strained and Strain-Compensated Phosphorus- Aluminum- and Nitrogen-Based 1.3um QW Lasers," (DD reference continued) Chinese Journal of Physics, Dec. 2004, vol. 42, No. 6; pp. 764-775.

Li, Hejie et al., "Extension of wavelength-modulation spectroscopy to large modulation depth for diode laser absorption measurements in high-pressure gases," Applied Optics, (EE reference continued) Feb. 10, 2006, vol. 45, No. 5; pp. 1052-1061.

Nakahara, Kouji, "High-Temperature and High-Speed Performances of InGaAlAs-MQW DFB Lasers for 10-Gb/s Datacom Applications," IEICE Trans Electron., May 2005, vol. E88-C, (FF reference continued) No. 5; pp. 938-943.

Paoletti, Roberto, et al., "Highly Reliable and High-Yield 1300-nm InGaAlAs Directly Modulated Ridge Fabry-Perot Lasers, Operating at 10-Gb/s, up to 110 C, (GG reference continued) with Constant Current Swing," Journal of Lightwave Technology, Jan. 2006, vol. 24, No. 1; pp. 143-149.

Sugawara, M., et al. "Recent progress in self-assembled quantum-dot optical devices for optical telecommunication: temperature-insensitive 10Gbs-1 directly modulated lasers (HH reference continued) and 40 Gbs-1 signal-regenerative amplifiers," Journal of Physics D: Applied Physics, 2005, 38, pp. 2126-2134.

Voronov, Yu.Yu. et al., "Absorption Spectra of Gasolines in the Region," Journal of Applied Spectroscopy, 2003, vol. 70, No. 4; pp. 628-631.

International Search Report for International Application No. PCT/US2008/072494. Mailed Oct. 24, 2008.

Written Opinion of the International Searching Authority or International Application No. PCT/US2008/072494. Mailed Oct. 24, 2008.

HIGH TEMPERATURE DOWNHOLE TOOL

BACKGROUND

1. Technical Field

The present disclosure generally relates to well bore tools and in particular to apparatus and methods for conducting downhole operations.

2. Background Information

Oil and gas wells have been drilled at depths ranging from a few thousand feet to as deep as 5 miles. Wireline and drilling tools often incorporate various sensors, instruments and control devices in order to carry out any number of downhole operations. These operations may include formation testing, fluid analysis, and tool monitoring and control.

The environment in these wells present many challenges to maintain the tools used at depth due to vibration, harsh chemicals and temperature. Temperature in downhole tool applications presents a unique problem to these tools. High downhole temperatures may reach as high as 390 degrees F or more, and sensitive electronic equipment must be cooled in order to work in the environment. An added problem is that space in the carrier assembly is usually limited to a few inches in diameter. Cooling systems take up valuable space in the tool carrier and add an additional failure point in the system.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is an apparatus for estimating a downhole parameter. The apparatus includes a high-gain semiconductor device having a plurality of semiconductor layers forming an active region, the active region having a bandgap offset that provides device operation through at least the temperature environment of a downhole location, the high-gain semiconductor device being used at least in part to estimate a downhole parameter.

In another aspect, a method for estimating a downhole parameter includes carrying a tool to a downhole location adjacent a subterranean formation using a carrier; and operating a high-gain semiconductor device and the tool together to estimate the downhole parameter, wherein the high-gain semiconductor includes a plurality of semiconductor layers forming an active region, the active region having a bandgap offset that provides device operation through at least the temperature environment of the downhole location.

In yet another aspect, a method for manufacturing a downhole semiconductor includes providing a substrate, providing a plurality of materials selected based in part on temperature effect on the materials, and combining the materials on the substrate using a layering process to form a high-gain semiconductor device having a plurality of semiconductor layers forming an active region, the active region having a bandgap offset that provides device operation through at least the temperature environment of a downhole location. In downhole applications, high temperatures cause stress on tools and reduce useful life without complex cooling systems designed into the tool used. Typical semiconductor devices are likewise subject to failure in high temperatures experienced in the downhole environment. Non-semiconductor devices may be larger and more susceptible to failure caused by drilling vibration, rough handling and tool impacts even in wireline operations.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Portions of the present disclosure, detailed description and claims may be presented in terms of logic, software or software implemented aspects typically encoded on a variety of media including, but not limited to, computer-readable media, machine-readable media, program storage media or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). Any embodiment disclosed herein is for illustration only and not by way of limiting the scope of the disclosure or claims.

The present disclosure uses terms, the meaning of which terms will aid in providing an understanding of the discussion herein. As used herein, high temperature refers to a range of temperatures typically experienced in oil production well boreholes. For the purposes of the present disclosure, high temperature and downhole temperature include a range of temperatures from about 100° C. to about 200° C. (about 212° F. to about 390° F.).

Figure 1:
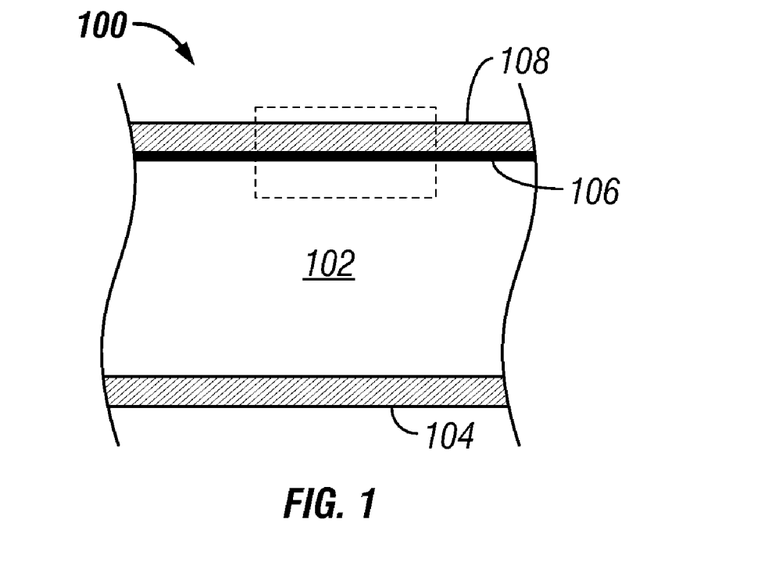
FIG. 1 is a cross section view of an exemplary high-gain semiconductor device that may be used in the several embodiments of the disclosure.

Referring now to FIG. 1, a cross section view of an exemplary high-gain semiconductor device 100 that may be used in the several embodiments of the disclosure is shown. As used herein, the term high-gain means that the ratio of output over input that is at least higher than unity. Depending on the type of semiconductor device, gain may refer to any output/input ratio. Non-limiting examples include voltage, current, power and light (optic gain). The high-gain semiconductor device 100 includes a substrate 102 disposed on a bottom electrode 104. A high-gain media 106 is disposed on the substrate 102 and a top electrode 108 is disposed on the high-gain region 106. The terms top and bottom are merely references with respect to the non-limiting example shown in FIG. 1, and any other electrode position and/or orientation is within the scope of the disclosure. The high-gain media semiconductor 100 may be configured for any application where a high-gain region 106 is desirable, and application where more than one junction and more than two electrodes are desired are within the scope of the disclosure. In several non-limiting examples, the semiconductor device may be a diode, a transistor, a field effect transistor (FET), a laser diode or any other useful semiconductor device using a high-gain media. For simplicity, the following discussion will use the two-electrode example illustrated.

The substrate 102 and high-gain media 106 of the present disclosure are selected and layered with respect to temperature that allows use with the temperature extremes of the well borehole environment. In several embodiments, in order to achieve higher temperature performance speed and bandwidth may be reduced by the selection of semiconductor materials and/or dimensions. For example, thicker layering of the high-gain media materials and substrate will increase temperature tolerance and may decrease device speed and bandwidth.

In several embodiments, the high-temperature high-gain media semiconductor device 100 may used in any number of sensor, communication, switching, amplification and information handling applications. In one non-limiting embodiment, the semiconductor 100 may be laser device that may be used in a downhole tool. In the instance of a semiconductor laser example, the laser device is a semiconductor laser where the high-gain media 106 will include an optical region sandwiched between the substrate 102 and the top electrode 108.

Figure 2:
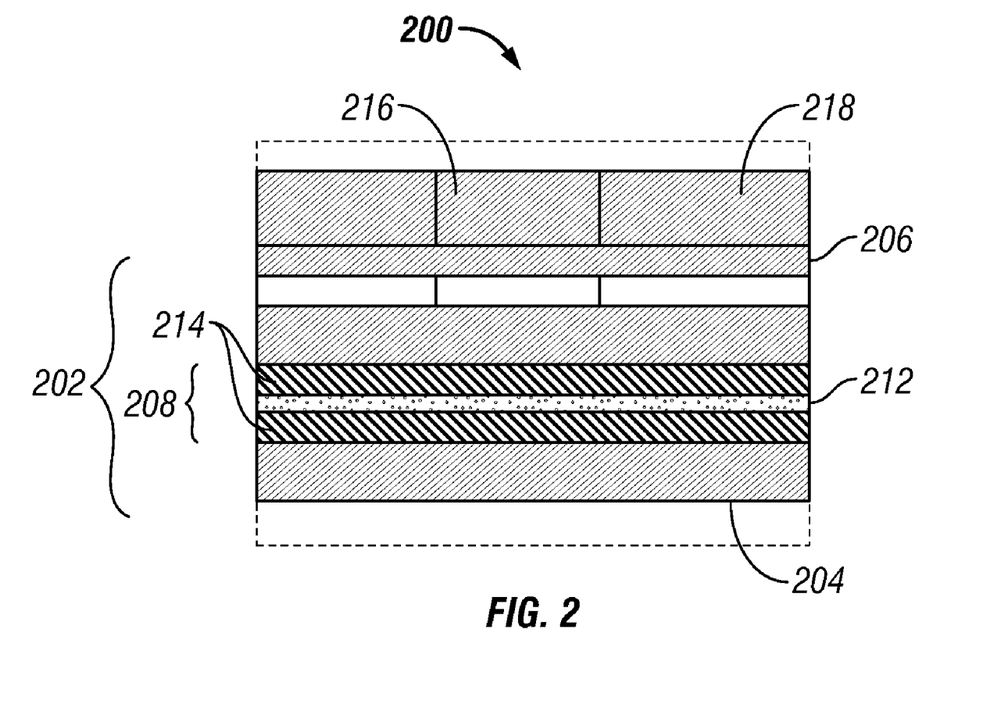
FIG. 2 illustrates a non-limiting example of a high-gain semiconductor according to FIG. 1 where the semiconductor is configured as a laser device.

FIG. 2 shows a cross section of the high-gain semiconductor of FIG. 1 in more detail and where the semiconductor is configured as a laser device 200. In this example, the laser device 200 includes an optical region 202. The optical region 202 includes layered semiconductors between a bottom mirror 204 and a top mirror 206. The semiconductor layers form an active region 208 between the top mirror 208 and the bottom mirror 206. The active region 210 is a region having a material (active material) that is excited by energy added to the materials. The active region 210 includes a light-emitting region 212 between cladding layers 214. The exemplary laser device 200 is that of a Vertical-Cavity Surface-Emitting Laser ("VCSEL") device that emits coherent light through a window 216 in a top electrode 218. The bottom mirror 206 in this VCSEL example is a fully reflective mirror, while the top mirror 208 allows some light to transmit through the electrode window 216. Although a VCSEL device is The active region 210 includes a Ga alloy cladding, such as a combination of $In_{(1-x)}Ga_xAs_yP_{(1-y)}$, $Al_{(1-x)}Ga_xAs$, or $In_{(1-x)}As_xP$. In several examples, a substrate of InP or of GaAs may be used depending on the desired wavelength of the laser. Laser wavelength may be modified in GaAs substrates by adding N to $In_{(1-x)}Ga_xAl_yAs_{(1-y)}$ or $In_{(1-x)}Ga_xAl_yAs_{(1-y)}$ quantum dots.

The high-gain media devices described above may be formed as herterostructure devices with layered semiconductor construction. Depending on the desired downhole application and particular performance requirements, the heterostructure device may take on several forms. FIGS. 3-6 schematically represent non-limiting examples of high-gain media heterostructure device configurations that may be used in the several embodiments disclosed herein as well as in other embodiments within the scope of the disclosure.

Figure 3:
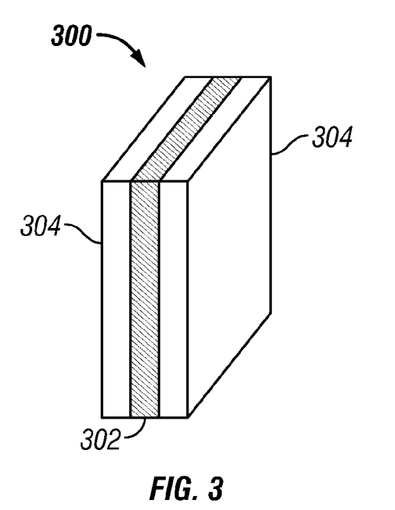
FIG. 3 is a non-limiting example of a layered semiconductor structure that may be used to construct a Quantum Well device useful in the several embodiments disclosed herein.
Figure 4:
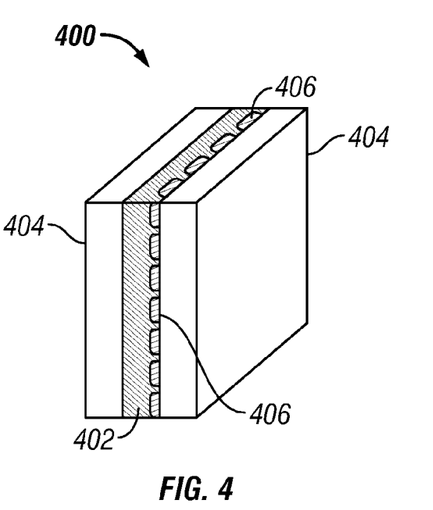
FIG. 4 is a non-limiting example of a layered semiconductor structure that may be used to construct a Quantum Dot device useful in the several embodiments disclosed herein.

FIG. 3 shows a non-limiting example of a layered semiconductor structure 300 that may be used to construct a Quantum Well device useful in the several embodiments disclosed herein. The structure 300 includes a layered active region 302 sandwiched between substrate layers 304. The active layer 302 may comprise any combination of semiconductor materials where the combination provides operation at downhole temperatures. Each substrate is shown without electrodes packaging FIG. 4 is another non-limiting example of a layered semiconductor structure 400 that may be used in a Quantum Dot device useful in the several embodiments disclosed herein. The structure 400 includes a layered active region 402 sandwiched between substrate layers 404. The active layer 402 may comprise any combination of semiconductor materials where the combination provides operation at downhole temperatures. During manufacture, additional semiconductor material is deposited in the active region 402 to form dot-like structures 406 providing the semiconductor device with Quantum Dash operating characteristics.

Figure 5:
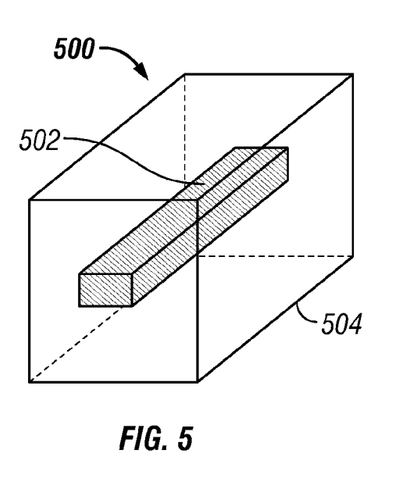
FIG. 5 is a non-limiting example of a layered semiconductor structure that may be used to construct a Quantum Wire device useful in the several embodiments disclosed herein.

FIG. 5 is a non-limiting example of a layered semiconductor structure 500 that may be used in a Quantum Wire device useful in the several embodiments disclosed herein. The structure 500 includes a layered active region 502 surrounded by substrate 504. The active layer 502 may comprise any combination of semiconductor materials where the combination provides operation at downhole temperatures. The active region 502 being relatively wire-like within the substrate 504 provides the device with Quantum Wire operating characteristics.

Figure 6:
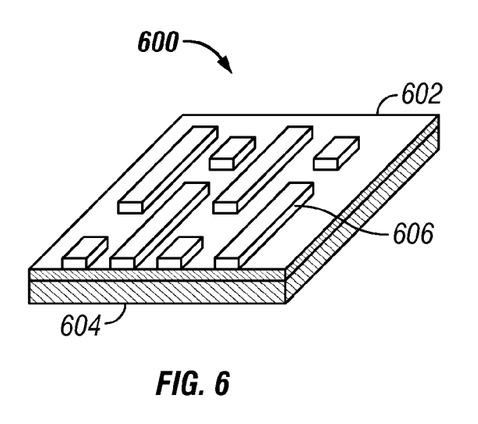
FIG. 6 illustrates a non-limiting example of as a layered semiconductor structure that may be used to construct a Quantum Dash device useful in the several embodiments disclosed herein.

FIG. 6 is another non-limiting example of a layered semiconductor structure 600 that may be used in a Quantum Dash device useful in the several embodiments disclosed herein. The structure 600 includes a layered active region 602 sandwiched between substrate layers 604 (only one being shown to illustrate the internal structure.). The active layer 602 may comprise any combination of semiconductor materials where the combination provides operation at downhole temperatures. During manufacture, additional semiconductor material is deposited in the active region 602 to form multiple ridge-like structures 606. These ridge-like structures provide the device with Quantum Dash operating characteristics.

Figure 7:
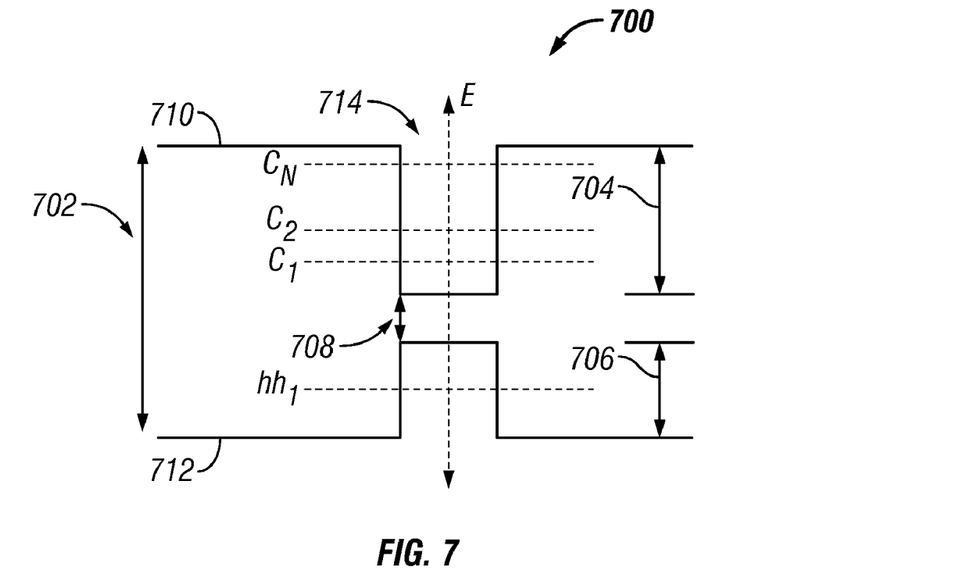
FIG. 7 represents an energy diagram for an exemplary heterostructure semiconductor device.

FIG. 7 represents an energy diagram 700 for an exemplary heterostructure semiconductor device similar to those devices disclosed herein. The diagram 700 shows a conduction band 710 and a valence band 712 representative of a quantum device such as a in a quantum well (QW) laser. An energy "potential well" 714 is created when one material is combined (sandwiched) between other materials of different composition. For example, ALGaAs layers sandwiching an InGaAs materials will produce potential well similar to the potential well 714. The valence band 712 in this example may be formed using materials oppositely-doped with respect to the materials in the conduction band 710.

The quantum well 714 in the conduction band 710 may include any number of quantum energy levels $C_1, C_2 \ldots C_N$ depending on the construction. Likewise, the valence band 712 will include one or more hole potentials hh1. The energy potential between a given quantum level C1 and a hole potential hh1 is the energy gap, and a barrier bandgap 702 exists between the top of the conduction band 710 and the bottom of the valence band 712. A conduction band offset exists between the top and bottom levels of the conduction band 710, and a valence band offset 706 exists between the top and bottom of the valence band 712. The operating characteristics of high-gain semiconductor devices are determined in part by the bad offsets 704, 706 shown here. It has been shown that bandgap engineering may be used to increase device speed at room temperature, however high-gain semiconductor devices used on downhole tools require cooling, such as sorption cooling devices, in order to operate reliably.

Figure 8:
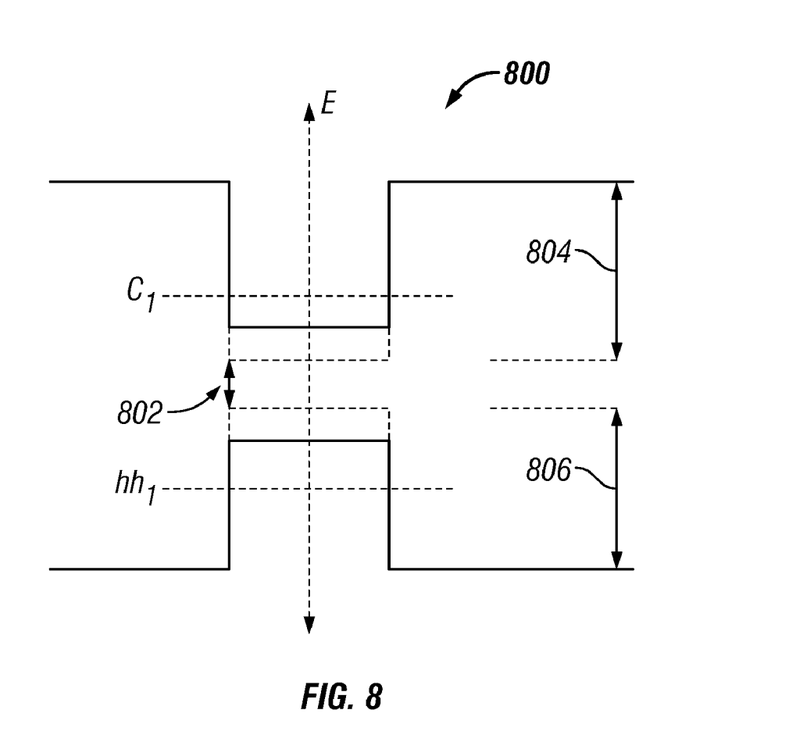
FIG. 8 is an example an energy diagram showing the effect of temperature-based bandgap engineering.

FIG. 8 illustrates the effect of bandgap engineering provided by the several examples in the disclosure where temperature effect is used to determine the bandgap offsets. The energy diagram 800 shows an adjusted bandgap 802, a larger conduction bandgap offset 804 and a larger valence bandgap offset 806.

The changes depicted in FIG. 8 may be accomplished by any utilizing any of several techniques for adjusting the bandgap and associated offsets. Lattice matching, layer size adjustment, semiconductor composition, strain adjustments and relaxation adjustments may be made in order to increase the operating temperature of a semiconductor device for reliable operation in a downhole temperature environment without the need for external cooling. The several embodiments described above and shown in FIGS. 1 through 6 may be constructed with respect to temperature by adjusting the bandgap and offsets for downhole operations. High-gain semiconductors, therefore, may be incorporated into any number of downhole tool components.

Figure 9:
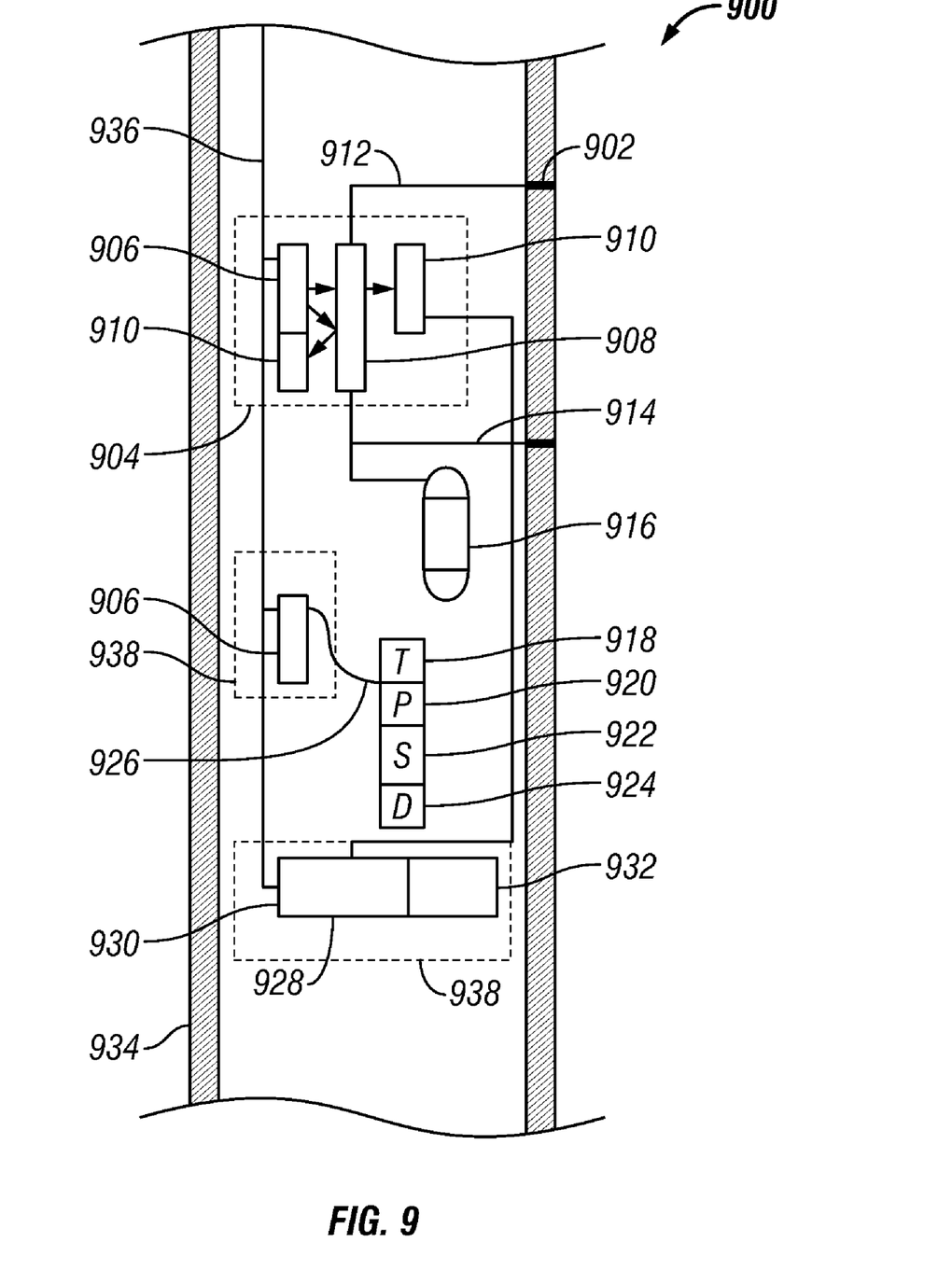
FIG. 9 schematically represents a non-limiting example of a tool for conducting a downhole operation.

FIG. 9 schematically represents a non-limiting example of a tool 900 for conducting a downhole operation. The tool 900 has a carrier 934 that carries the tool into a well borehole. The tool 900 may include any number of devices for conducting downhole operations, and several devices may include a high-gain semiconductor such as those described above and shown in FIGS. 1 through 6 that are selected for operation in the high temperatures typical of the downhole environment. In one example, the tool 900 may include a spectrometer 904. In another example, the tool 900 may include one or more of a temperature sensor 918, a pressure sensor 920, a stress sensor 922 and/or a distance sensor 924. The stress sensor may also be acceleration and/or a vibration sensor. A downhole computing device 928 includes a processor 930 and a memory 932. The downhole computing device 928 may be coupled to the spectrometer 904 when included in the tool 900. In several examples, the downhole computing device 928 may be in communication with other sensors 918, 920, 922, 925, when included, and may further be in communication with a high-gain semiconductor 906 used with the several sensors. Power and data may be conveyed to and from the sensors, spectrometer and computing device using an electrical conductor cable 936. In some cases, an optical fiber 926 may be used for communicating information between tool components.

Several tool devices according to the disclosure may be used to sample and/or test formation or well bore fluids. A port 902 may be used to convey fluid into the tool 900 through a fluid conduit 912. In some cases a sample chamber 916 may be included for holding or transporting fluid samples. Fluids may be expelled from the tool when desired by including a port 914 for directing the fluids into the annulus out side of the tool 900.

The exemplary spectrometer 904 may include a light source 906, a sample region 908 and one or more detectors 910. In several embodiments, the light source 906 includes a high-gain semiconductor used as a laser light source. The high-gain semiconductor may provide light having a broader emission band than that of a laser where such a light source is desired. In each case, the high-gain semiconductor may be selected for high-temperature operation by using a configuration as described above and shown in FIGS. 1-6. The several sensors 918, 920, 922, and 924 described above may also include a light source 906 emitting laser or other useful light. In some cases, sensors or other tool devices may use a high-gain semiconductor device such as a FET, LED, MOSFET, transistor, diode or the like where the semiconductor includes the high-temperature structure described above and shown in FIGS. 1-6.

The spectrometer 904 may be used for measuring refractive index of the formation fluid. In this case, the light detector 910 may be located so as to receive light after reflection and refraction from a fluid sample in the fluid sample region 908. In other examples, the detector 910 may be placed such that light emitted from the light source 906 passes through the sample region 908 and is detected at the detector 910. The carrier 934 may be configured for conveying the tool 900 either on a while-drilling apparatus or on a wireline apparatus. In several examples, the carrier 934 may include a jointed pipe, a wired pipe, a coiled tube or a wireline. Some or all of these carrier examples may be combined.

While the high-gain semiconductor devices 906 of the present disclosure may be used at downhole temperatures without cooling, it is contemplated that cooling devices 938 may be utilized for cooling the semiconductor devices 906, other components such as the computing device 928 or other tool components without departing from the scope of the invention. Examples of cooling devices 938 may include sorption cooling devices, Dewar and thermo-electric cooling devices.

Figure 10:
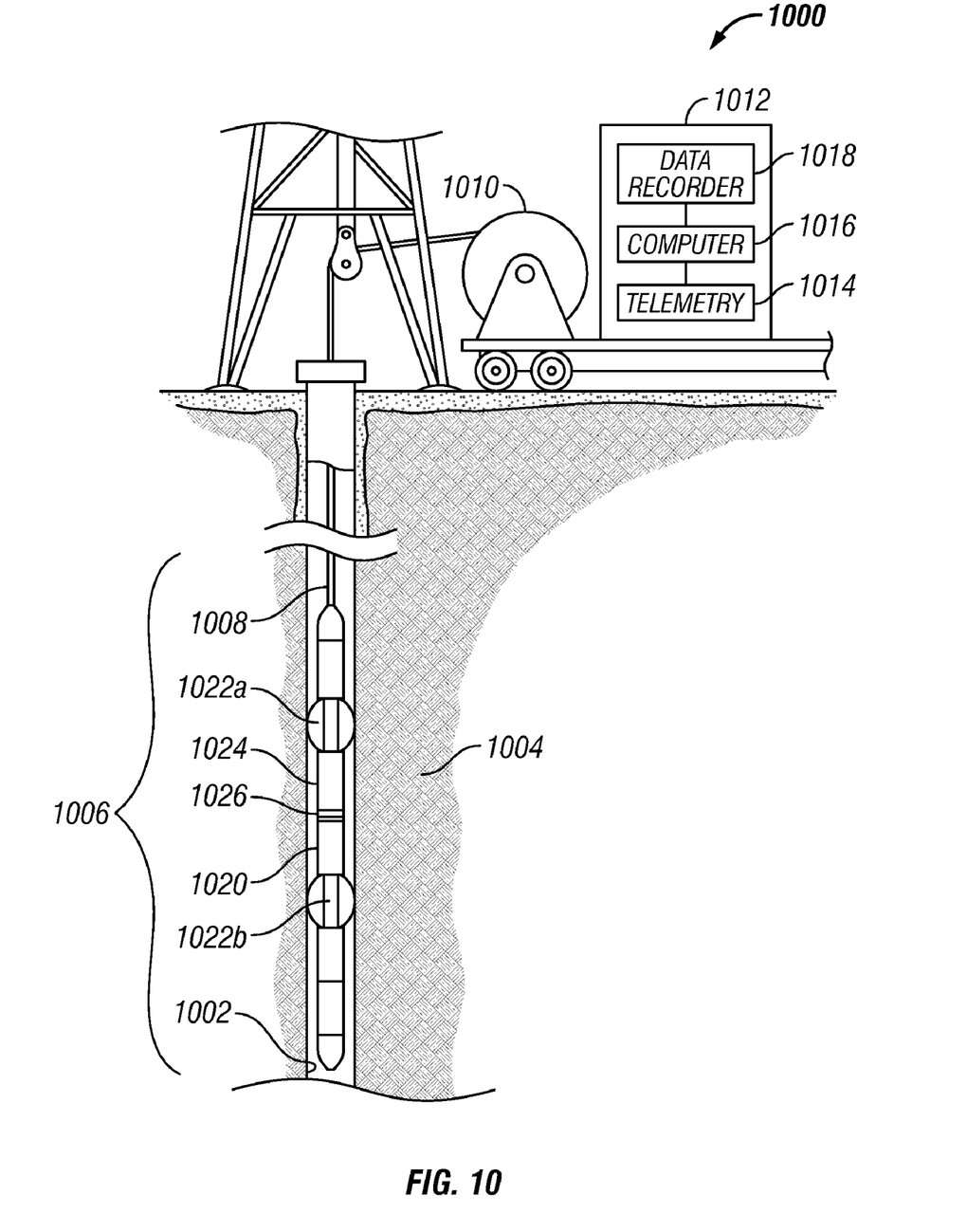
FIG. 10 is a non-limiting example of a well logging apparatus according to several embodiments of the disclosure.

FIG. 10 shows a non-limiting example of a well logging apparatus 1000 according to several embodiments of the disclosure. The well logging apparatus 1000 is shown disposed in a well borehole 1002 penetrating earth formations 1004 for making measurements of properties of the earth formations 1004. The borehole 1002 is typically filled with drilling fluid to prevent formation fluid influx.

A string of logging tools 1006 is lowered into the well borehole 1002 by an armored electrical cable 1008. The cable 1008 can be spooled and unspooled from a winch or drum 1010. The tool string 1006 can be electrically connected to surface equipment 1012 by an optical fiber (not shown separately) forming part of the cable 1008. The surface equipment 1012 can include one part of a telemetry system 1014 for communicating control signals and data to the tool string 1006 and computer 1016. The computer can also include a data recorder 1018 for recording measurements made by the apparatus and transmitted to the surface equipment 1012.

One or more logging devices 1020 form part of the tool string 1006. The tool string 1006 is preferably centered within the well borehole 1002 by a top centralizer 1022a and a bottom centralizer 1022b attached to the tool string 1006 at axially spaced apart locations. The centralizers 1022a, 1022b can be of types known in the art such as bowsprings.

Circuitry for operating the logging tool 1020 may be located within the string 1006 and within the electronics cartridge 1024. The circuitry may further be connected to the tool 1020 through a connector 1026. In several embodiments, the logging tool 1020 may incorporate a high-gain semiconductor device such as any of the devices described herein and shown in FIGS. 1 through 6. In several embodiments, the tool 1020 may include any of the configurations as described above and shown in FIG. 9.

Figure 11:
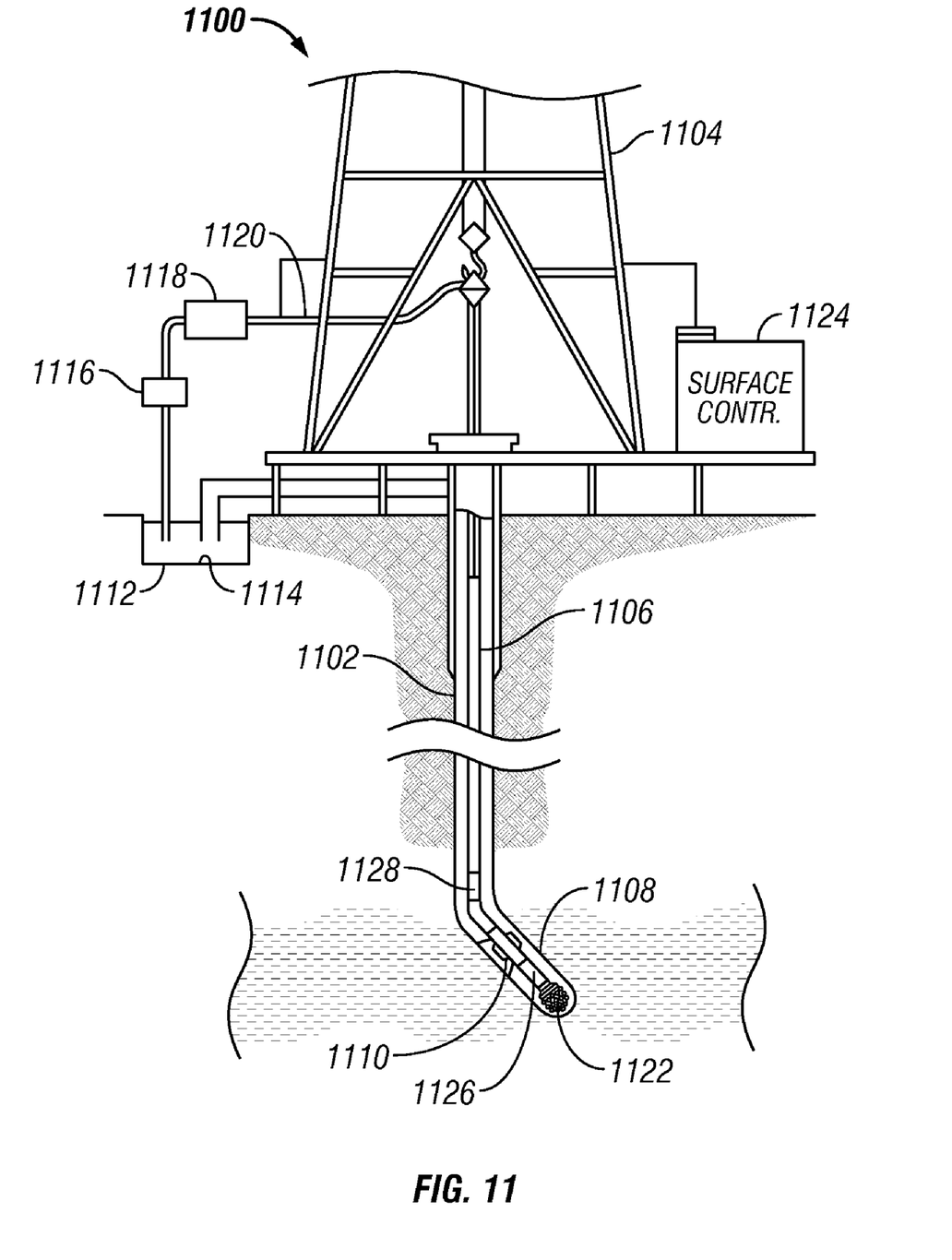
FIG. 11 is a non-limiting elevation view of an exemplary simultaneous drilling and logging system that incorporates several aspects of the disclosure.

FIG. 11 is an elevation view of a simultaneous drilling and logging system that may incorporate non-limiting embodiments of the disclosure. A well borehole 1102 is drilled into the earth under control of surface equipment including a drilling rig 1104. In accordance with a conventional arrangement, rig 1104 includes a drill string 1106. The drill string 1106 may be a coiled tube, jointed pipes or wired pipes as understood by those skilled in the art. In one example, a bottom hole assembly (BHA) 1108 may include a tool 1110 according to the disclosure.

While-drilling tools will typically include a drilling fluid 1112 circulated from a mud pit 1114 through a mud pump 1116, past a desurger 1118, through a mud supply line 1120. The drilling fluid 1112 flows down through a longitudinal central bore in the drill string, and through jets (not shown) in the lower face of a drill bit 1122. Return fluid containing drilling mud, cuttings and formation fluid flows back up through the annular space between the outer surface of the drill string and the inner surface of the borehole to be circulated to the surface where it is returned to the mud pit.

The system in FIG. 11 may use any conventional telemetry methods and devices for communication between the surface and downhole components. In the embodiment shown mud pulse telemetry techniques are used to communicate data from downhole to the surface during drilling operations. A surface controller 1124 may be used for processing commands and other information used in the drilling operations.

If applicable, the drill string 1106 can have a downhole drill motor 1126 for rotating the drill bit 1122. In several embodiments, the while-drilling tool 1110 may incorporate a high-gain semiconductor device such as any of the devices described herein and shown in FIGS. 1 through 6. In several embodiments, the tool 1110 may include any of the configurations as described above and shown in FIG. 9.

A telemetry system 1128 may be located in a suitable location on the drill string 1106 such as above the tool 1110. The telemetry system 1128 may be used to receive commands from, and send data to, the surface via the mud pulse telemetry described above or by other communication techniques known in the art. For example, acoustic pipe telemetry and/or wired pipe telemetry may be used.

The surface controller 1124 may include a processor, memory for storing data, data recorder and other peripherals. The surface controller 1124 may also respond to user commands entered through a suitable device, such as a keyboard. In one non-limiting embodiment, the BHA 1126 contains various sensors and logging-while-drilling (LWD) devices incorporating aspects of the disclosure to provide information about the formation, downhole drilling parameters and the mud motor.

Figure 12:
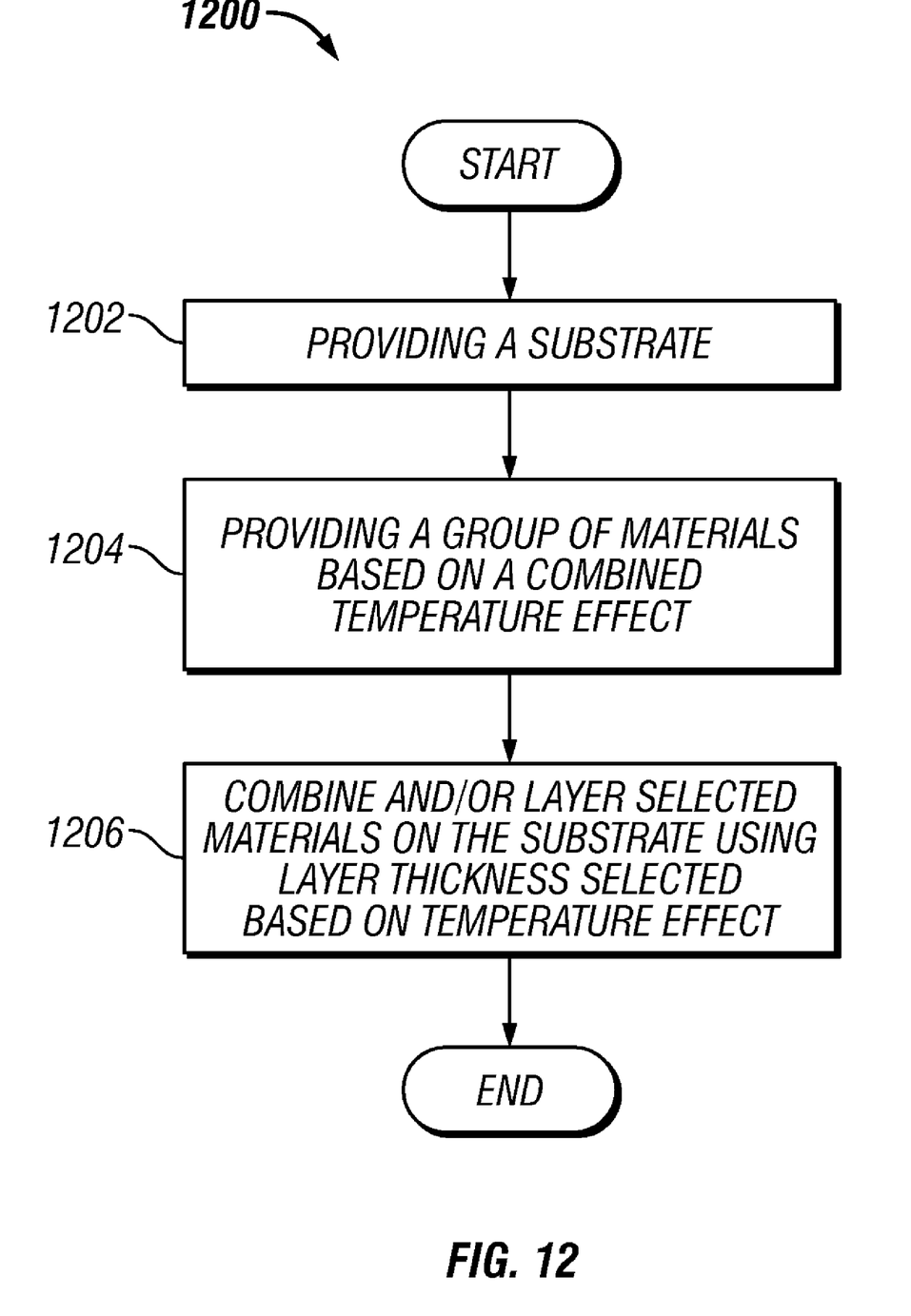
FIG. 12 is a non-limiting example of a method for constructing a high-gain semiconductor device.

FIG. 12 shows a non-limiting example of a method 1200 for forming a high-temperature semiconductor device for use in a downhole operation. The method includes selecting a substrate 1202, selecting a group of materials based on a combined temperature effect 1204 and combining and/or layering the selected materials on the substrate using a layer thickness selected based on temperature effect.

The substrate may be selected from any suitable semiconductor material. In one example, the selected substrate includes a Ga alloy cladding, such as a combination of InGaAsP, AlGaAs, or InAsP. In several examples, a substrate of InP or of GaAs may be used depending Selecting a group of materials based on combined temperature effect may include the selection of any suitable combination, which combination helps provide device operation in the downhole temperature environment. Combining the materials may include a layering process, a deposition process, wet etching, dry etching, and other known manufacturing processes suitable for combining semiconductor materials. The present disclosure includes combining the materials such that the combination characteristics are selected to increase operating temperature of the high-gain semiconductor device. In one example, the combination includes creating a heterostructure. In one example, the combining includes combining the materials to adjust the strain in the media. In one example, the combining includes adjusting layer thickness to increase operating temperature. In several examples, the selection and combining are performed such that operating speed is reduced while operating temperature is increased.

Having described above the several aspects of the disclosure, one skilled in the art will appreciate several particular embodiments useful in determining a property of an earth subsurface structure.

In one particular embodiment a well tool includes a high-gain semiconductor device having a plurality of semiconductor layers forming an active region. The active region has a bandgap offset that provides device operation through at least the temperature environment of a downhole location. The high-gain semiconductor device being used at least in part to estimate a downhole parameter.

In several embodiments a well tool includes a high-gain semiconductor device that comprises a light source. In on embodiment the light source may be a laser light source, while in other particular embodiments the light source may provide incoherent light.

In several particular embodiments, a downhole tool utilizing a high-gain semiconductor device may be used to estimate one or more of sample absorbance, sample reflectance, temperature, pressure, strain, acceleration, vibration and flow rate.

Where particular embodiments disclosed herein operate at downhole temperatures, the temperature environment at the downhole location may exceed 80° C., 100° C. or may be within a range of about 100° C. to about 200° C.

Embodiments may include operating a high-gain semiconductor that is in direct thermal communication with the downhole temperature environment, or a cooling device may be used.

In some embodiments, a downhole tool includes a high-gain semiconductor that is constructed using layers of direct bandgap semiconductors. High-gain semiconductors disclosed herein may include semiconductor layers of direct bandgap semiconductors that include one or more of gallium, aluminum, arsenide, phosphide, indium and nitride. The materials used may be combined in any number of combinations, examples of which include one or more of GaAs, InP, GaP, GaN, Al(1-x)GaxAs, Tn(1-x)GaxAs, Ga(1-x)InxP, Tn(1-x)GaxP, In(1-x)AlxAs, In(1-x)AsxP, In(1-x)GaxAsyP (1-y), and In(1-x)GaxAlyAs(1-y).

In any of the several embodiments disclosed, the high-gain semiconductor device may include a bandgap offset that is increased during manufacturing with respect to operating temperature. In one example, the bandgap offset is includes strain material at a heterojunction layer boundary, and in others a combination of direct bandgap semiconductor materials increases the bandgap offset.

High-gain semiconductor devices disclosed herein may include a quantum well device, a quantum dot device, a quantum wire device, and/or a quantum dash device.

In one embodiment, a downhole tool includes a light transmitting member defining a fluid test volume, a photodetector responsive to light emitted from a high-gain semiconductor device laser after the light interacts with a formation fluid within the fluid test volume, and a processor in communication with the photodetector. In another aspect, an estimated parameter includes a pressure, and light emitted from a high-gain semiconductor device being responsive to pressure, is sensed by a transducer that converts the light to an electrical signal, and a processor receives the electrical signal and processes the signal for estimating the pressure. In yet another example, an estimated parameter includes a temperature, and the tool includes a light receiving sensor that is responsive to light changes due to temperature, the light receiving sensor produces an electrical signal, and a processor receives the electrical for estimating the temperature. In some embodiments, an estimated downhole parameter includes a strain, and a tool includes a light receiving sensor responsive to light changes due to strain, the light receiving sensor producing an electrical signal, and a processor receives the electrical for estimating the strain. In one particular embodiment, an estimated parameter includes a fluid flow rate, and a tool includes a light transmitting member defining a fluid test volume, a photodetector is responsive to light emitted from a laser after the light interacts with a formation fluid flowing within the fluid test volume and a processor in communication with the photodetector processes a photodetector output representative of fluid flow rate within the fluid test volume.

In several operational embodiments methods for estimating a downhole parameter are disclosed. One method includes carrying a tool to a downhole location adjacent a subterranean formation using a carrier, and operating a high-gain semiconductor device and the tool together to estimate the downhole parameter, wherein the high-gain semiconductor includes a plurality of semiconductor layers forming an active region, the active region having a bandgap offset that provides device operation through at least the temperature environment of the downhole location.

In one particular embodiment, a method for estimating a downhole parameter includes emitting a light from the light source that uses a high-gain semiconductor device. In one embodiment, the high-gain semiconductor device comprises a laser light source, and the method includes emitting laser light from the light source, while in another particular embodiment a method includes emitting an incoherent light.

In several particular embodiments, methods for estimating a downhole parameter include estimating one or more of i) sample absorbance, ii) sample reflectance, iii) temperature, iv) pressure, v) strain, vi) acceleration, vii) vibration and viii) flow rate. In several other particular embodiments, methods for estimating a downhole parameter include operating a high-gain semiconductor comprises operating in a downhole temperature environment that exceeds 80° C., that exceeds 100° C. and that includes a range of about 100° C. to about 200° C.

In one particular embodiment, a method for manufacturing a downhole semiconductor includes providing a substrate, providing a plurality of materials selected based in part on temperature effect on the materials, and combining the materials on the substrate using a layering process to form a high-gain semiconductor device having a plurality of semiconductor layers forming an active region, the active region having a bandgap offset that provides device operation through at least the temperature environment of a downhole location.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A downhole apparatus well tool apparatus comprising:
a high-gain semiconductor device having a plurality of semiconductor layers forming an active region, the active region having a bandgap offset that adjusts an operating temperature of the semiconductor device operation to at least the temperature environment of a downhole location, the high-gain semiconductor device being used at least in part to estimate a downhole parameter.

2. An apparatus according to claim 1, wherein the high-gain semiconductor device comprises a light source.

3. An apparatus according to claim 1, wherein the high-gain semiconductor device comprises a laser light source.

4. An apparatus according to claim 2, wherein the light source provides incoherent light.

5. An apparatus according to claim 1, wherein the downhole parameter includes one or more of i) sample absorbance, ii) sample reflectance, iii) temperature, iv) pressure, v) strain, vi) acceleration, vii) vibration, and viii) flow rate.

6. An apparatus according to claim 1, wherein the downhole temperature environment exceeds 80° C.

7. An apparatus according to claim 1, wherein the downhole temperature environment exceeds 100° C.

8. An apparatus according to claim 1, wherein the downhole temperature environment includes a range of about 100° C. to about 200° C.

9. An apparatus according to claim 1, wherein the high-gain semiconductor is in direct thermal contact with the downhole temperature environment.

10. An apparatus according to claim 1, wherein the plurality of semiconductor layers comprise direct bandgap semiconductors.

11. An apparatus according to claim 1, wherein the plurality of semiconductor layers comprise direct bandgap semiconductors that include one or more of gallium, aluminum, arsenide, phosphide, indium and nitride.

12. An apparatus according to claim 1, wherein the plurality of semiconductor layers include one or more of GaAs, InP, GaP, GaN, $Al_{(1-x)}Ga_xAs$, $In_{(1-x)}Ga_xAs$, $Ga_{(1-x)}In_xP$, $In_{(1-x)}Ga_xP$, $In_{(1-x)}Al_xAs$, $In_{(1-x)}As_xP$, $In_{(1-x)}Ga_xAs_yP_{(1-y)}$, and $In_{(1-x)}Ga_xAl_yAs_{(1-x)}$.

13. An apparatus according to claim 1, where the high-gain semiconductor device includes a bandgap offset that is increased during manufacturing with respect to operating temperature.

14. An apparatus according to claim 13, wherein the bandgap offset is includes strain material at a heterojunction layer boundary.

15. An apparatus according to claim 13, wherein a combination of direct bandgap semiconductor materials increases the bandgap offset.

16. An apparatus according to claim 1, wherein the high-gain semiconductor device comprises a quantum well device.

17. An apparatus according to claim 1, wherein the high-gain semiconductor device comprises one or more if a quantum dot device, a quantum wire device, and a quantum dash device.

18. An apparatus according to claim 3, wherein the tool further comprises a light transmitting member defining a fluid test volume, a photodetector responsive to light emitted from the high-gain semiconductor device laser after the light interacts with a formation fluid within the fluid test volume, and a processor in communication with the photodetector.

19. An apparatus according to claim 2, wherein the downhole parameter includes a pressure, light emitted from the high-gain semiconductor device being responsive to pressure, a transducer that converts the light to an electrical signal, and a processor that receives the electrical signal and processes the signal for estimating the pressure.

20. An apparatus according to claim 2, wherein the downhole parameter includes a temperature, the tool further comprising a light receiving sensor responsive to light changes due to temperature, the light receiving sensor producing an electrical signal, and a processor that receives the electrical for estimating the temperature.

21. An apparatus according to claim 2, wherein the downhole parameter includes a strain, the tool further comprising a light receiving sensor responsive to light changes due to strain, the light receiving sensor producing an electrical signal, and a processor that receives the electrical for estimating the strain.

22. An apparatus according to claim 2, wherein the downhole parameter includes a fluid flow rate, the tool further comprising a light transmitting member defining a fluid test volume, a photodetector responsive to light emitted from the laser after the light interacts with a formation fluid flowing within the fluid test volume and a processor in communication with the photodetector that processes a photodetector output representative of fluid flow rate within the fluid test volume.

23. An apparatus according to claim 1, wherein the downhole parameter includes at least one of, a drilling tool parameter, a borehole parameter, a formation parameter and a formation sample parameter.

24. An apparatus according to claim 1 further comprising a cooling device for cooling one or more of the high-gain semiconductor device and a second tool component.

25. A method for estimating a downhole parameter, the method comprising:
carrying a tool to a downhole location adjacent a subterranean formation using a carrier; and
operating a high-gain semiconductor device and the tool together to estimate the downhole parameter, wherein the high-gain semiconductor includes a plurality of semiconductor layers forming an active region, the active region having a bandgap offset that adjusts an operating temperature of the semiconductor device operation to at least the temperature environment of the downhole location.

26. A method according to claim 25, wherein the high-gain semiconductor device comprises a light source, the method further comprising emitting a light from the light source.

27. A method according to claim 25, wherein the high-gain semiconductor device comprises a laser light source, the method further comprising emitting laser light from the light source.

28. A method according to claim 26, wherein emitting light comprises emitting an incoherent light.

29. A method according to claim 25, wherein estimating the downhole parameter includes estimating one or more of i) sample absorbance, ii) sample reflectance, iii) temperature, iv) pressure, v) strain vi) acceleration, vii) vibration and viii) flow rate.

30. A method according to claim 25, wherein operating the high-gain semiconductor comprises operating in a downhole temperature environment that exceeds 80° C.

31. A method according to claim 25, wherein operating the high-gain semiconductor comprises operating in a downhole temperature environment that exceeds 100° C.

32. A method according to claim 25, wherein operating the high-gain semiconductor comprises operating in a downhole temperature environment that includes a range of about 100° C. to about 200° C.

33. A method according to claim 25, wherein the plurality of semiconductor layers comprise direct bandgap semiconductors that include one or more of gallium, aluminum, arsenide, phosphide, indium and nitride.

34. A method according to claim 25, wherein the plurality of semiconductor layers include one or more of GaAs, InP, GaP, GaN, $Al_{(1-x)}Ga_xAs$, $In_{(1-x)}Ga_xAs$, $Ga_{(1-x)}In_xP$, $In_{(1-x)}Ga_xP$, $In_{(1-x)}Al_xAs$, $In_{(1-x)}As_xP$, $In_{(1-x)}Ga_xAs_yP_{(1-y)}$, and $In_{(1-x)}Ga_xAl_yAs_{(1-y)}$.

35. A method according to claim 25, wherein the high-gain semiconductor device comprises a quantum well device.

36. A method according to claim 25, wherein the high-gain semiconductor device comprises one or more of a quantum dot device, a quantum wire device, and a quantum dash device.

37. A method for manufacturing a downhole semiconductor comprising:
providing a substrate;
providing a plurality of materials selected based in part on temperature effect on the materials; and
combining the materials on the substrate using a layering process to form a high-gain semiconductor device having a plurality of semiconductor layers forming an active region, the active region having a bandgap offset that adjusts an operating temperature of the semiconductor device operation to at least the temperature environment of a downhole location.

* * * * *